United States Patent [19]
Arnold

[11] 3,752,281
[45] Aug. 14, 1973

[54] REVERSING CLUTCHES WITH SELECTOR AND PRESSURE MODULATING VALVE
[75] Inventor: Bruce C. Arnold, Racine, Wis.
[73] Assignee: Twin Disc Incorporated, Racine, Wis.
[22] Filed: May 10, 1972
[21] Appl. No.: 252,098

[52] U.S. Cl....... 192/87.19, 192/109 F, 137/625.24, 137/625.66, 74/361, 91/413
[51] Int. Cl............................................. F16d 25/10
[58] Field of Search...................... 192/87.18, 87.19, 192/51, 4 A, 4 C, .098, 109 F; 137/625.24, 625.66

[56] References Cited
UNITED STATES PATENTS

| | | | |
|---|---|---|---|
| 2,426,064 | 8/1947 | Stevens | 192/.098 X |
| 2,877,668 | 3/1959 | Kelbel | 137/625.24 |
| 2,925,156 | 2/1960 | Grant et al. | 192/109 F |
| 3,007,347 | 11/1961 | Gendron et al. | 192/109 F |
| 3,243,025 | 3/1966 | Staab et al. | 192/87.19 |

Primary Examiner—Benjamin W. Wyche
Attorney—James E. Nilles

[57] ABSTRACT

A power transmission including a forward, friction plate, modulating type friction clutch; a reverse, friction plate, modulating type clutch; a selector control valve assembly therefor, which assembly has a rotatable selector spool that during its first rotational movement acts to select the proper direction of the travel for the water craft or vehicle with which the present invention is used. Additional rotation of the selector spool in the selected direction then acts to cause a predetermined amount of modulating pressure to the selected hydraulically actuated friction type clutch. The amount of modulating pressure available selectively to either the forward or reverse clutch is determined by the amount of rotation given to the selector spool of the valve assembly and when this selected pressure has been reached, the valve assembly then reaches an equilibrium condition.

An improved valve assembly having a rotatable selector spool which during its initial rotational movement acts to select either a forward or reverse, hydraulically actuated, friction plate type clutch, and then during additional rotational movement of the valve acts to provide modulating pressure for the selected clutch at the pressure determined by the rotational movement of the selector spool. After the desired amount of modulating pressure has been provided to the selected clutch, the valve assembly again reaches an equilibrium position where it is ready for the next command of the operator.

A water craft having a propeller shaft capable of being driven in either rotational direction, a source of power, and a transmission driven by said source of power, said transmission including a pair of hydraulically actuated, friction plate, modulating type clutches, one for reverse and one for forward direction of the craft, and a control valve assembly for said clutches and including a rotatable selector spool. During the initial rotational movement of the selector spool, one of the clutches is selected to drive the craft in either forward or reverse directions and then continued rotational movement of the spool causes the desired amount of modulating pressure to be available to the hydraulically actuated, modulating type friction plate clutch.

8 Claims, 23 Drawing Figures

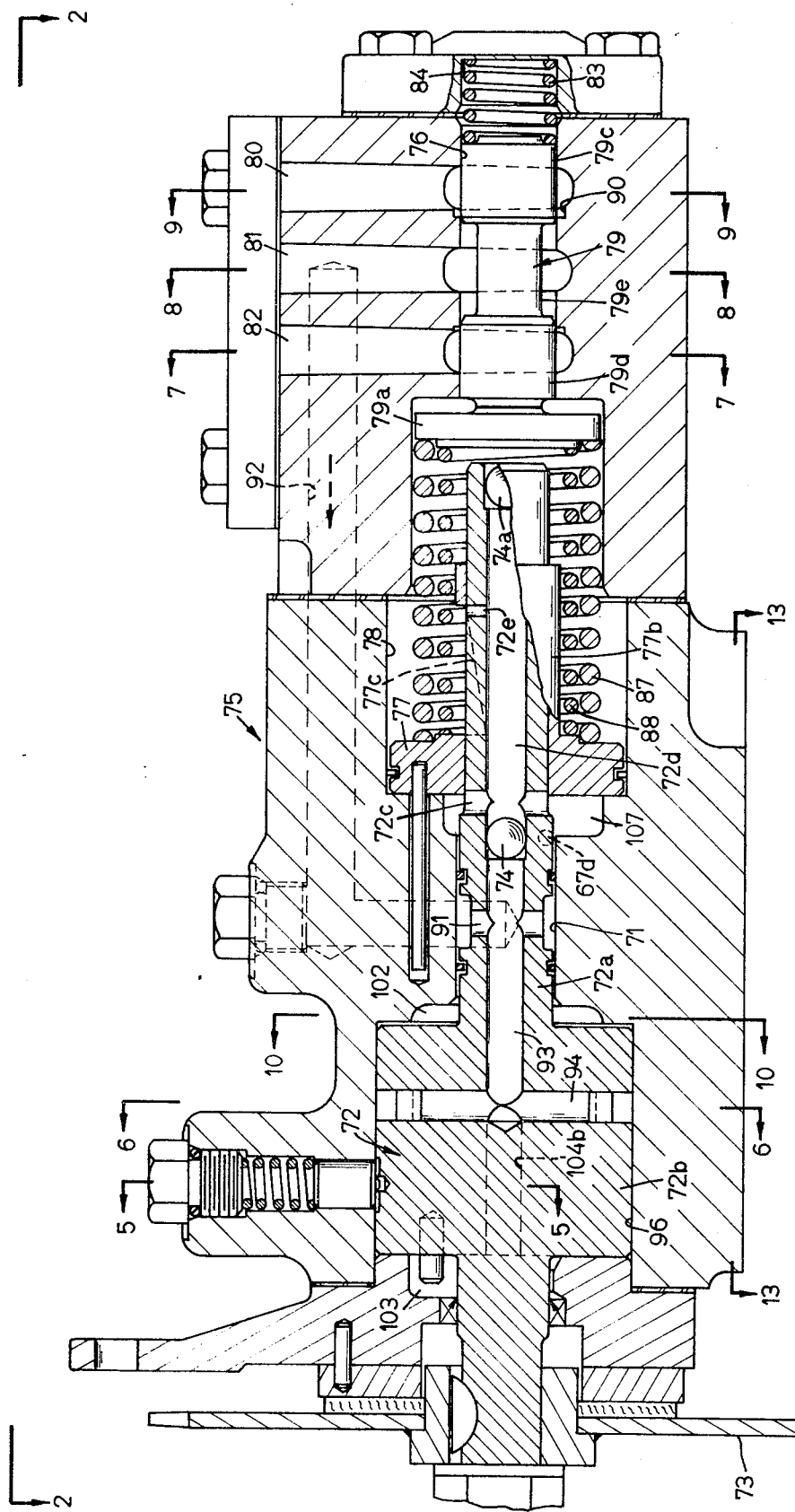

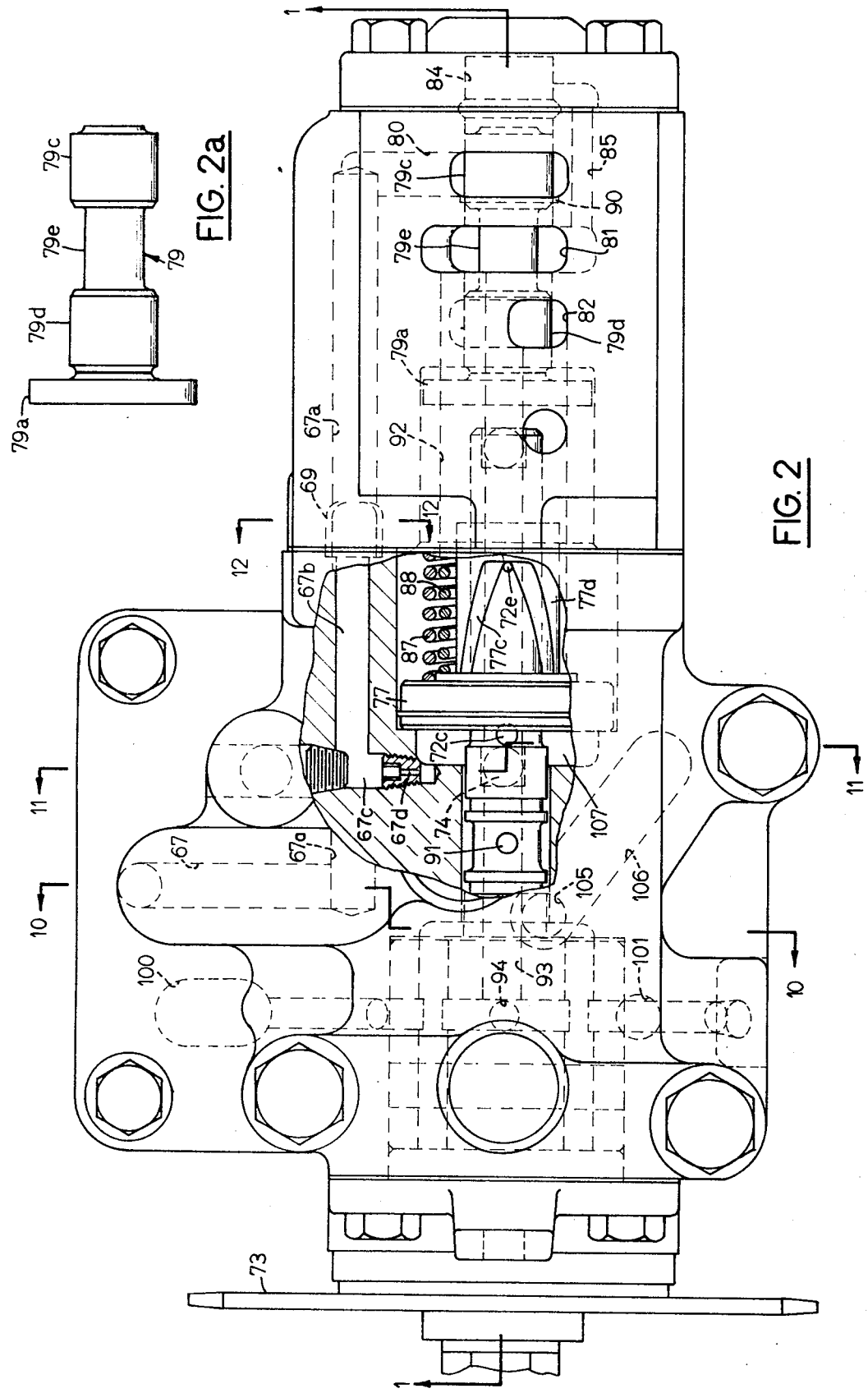

Patented Aug. 14, 1973

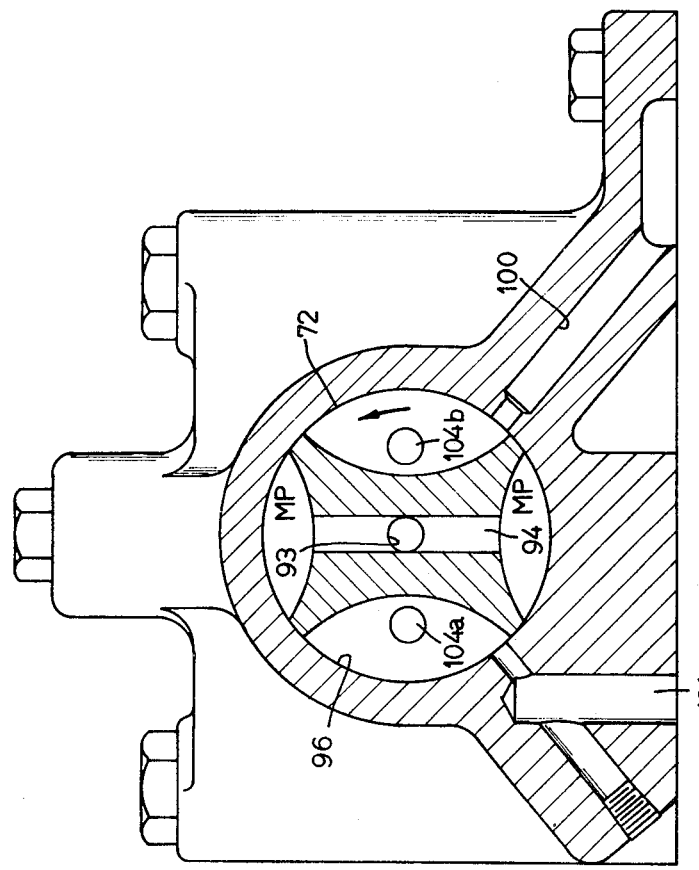
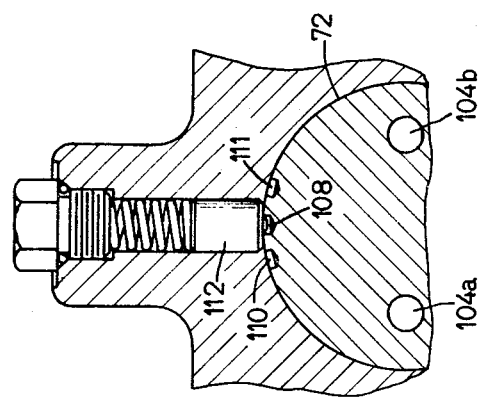

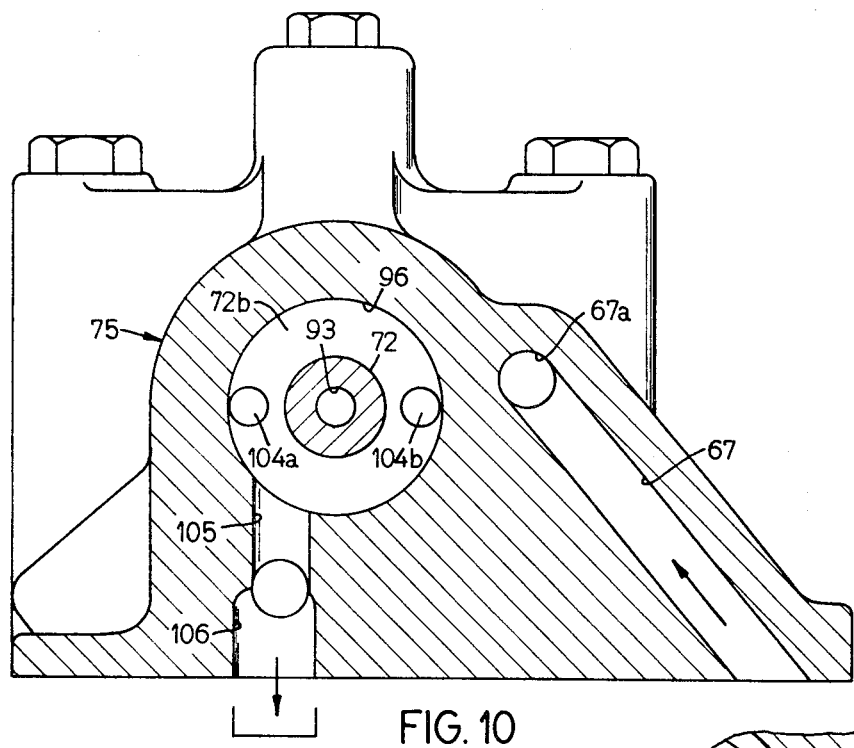
FIG. 10
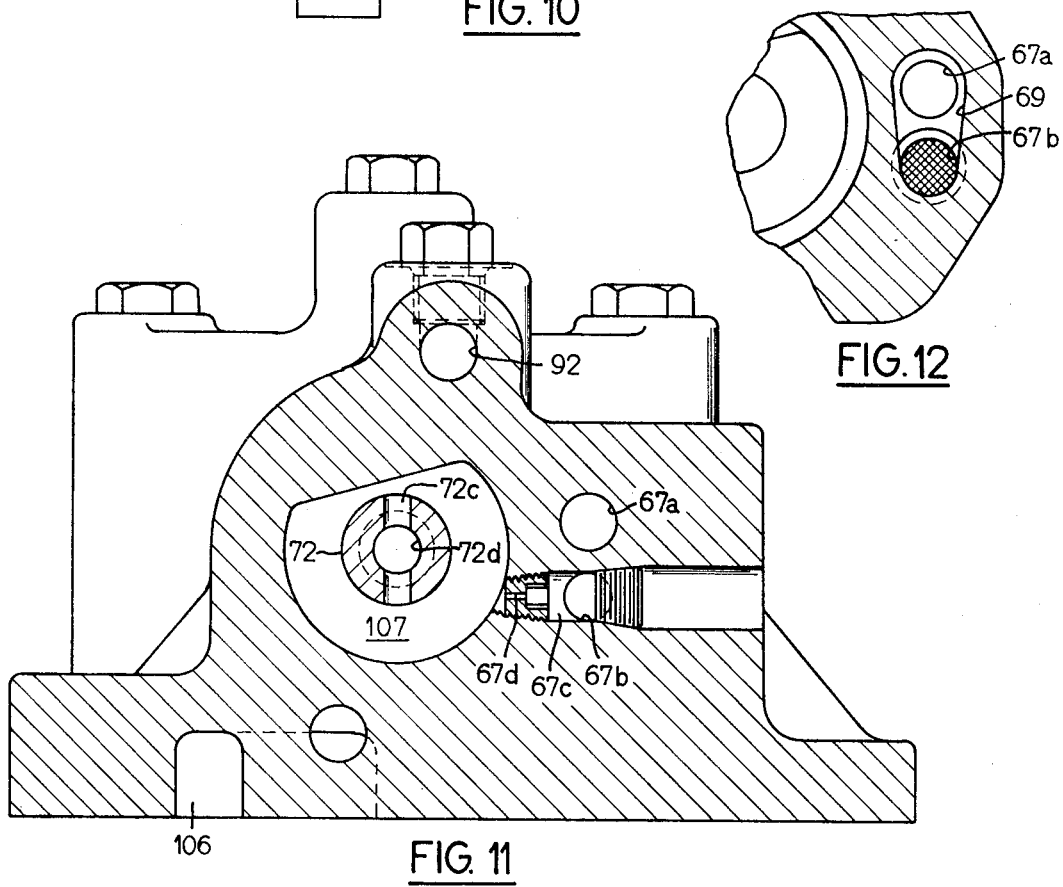
FIG. 12
FIG. 11

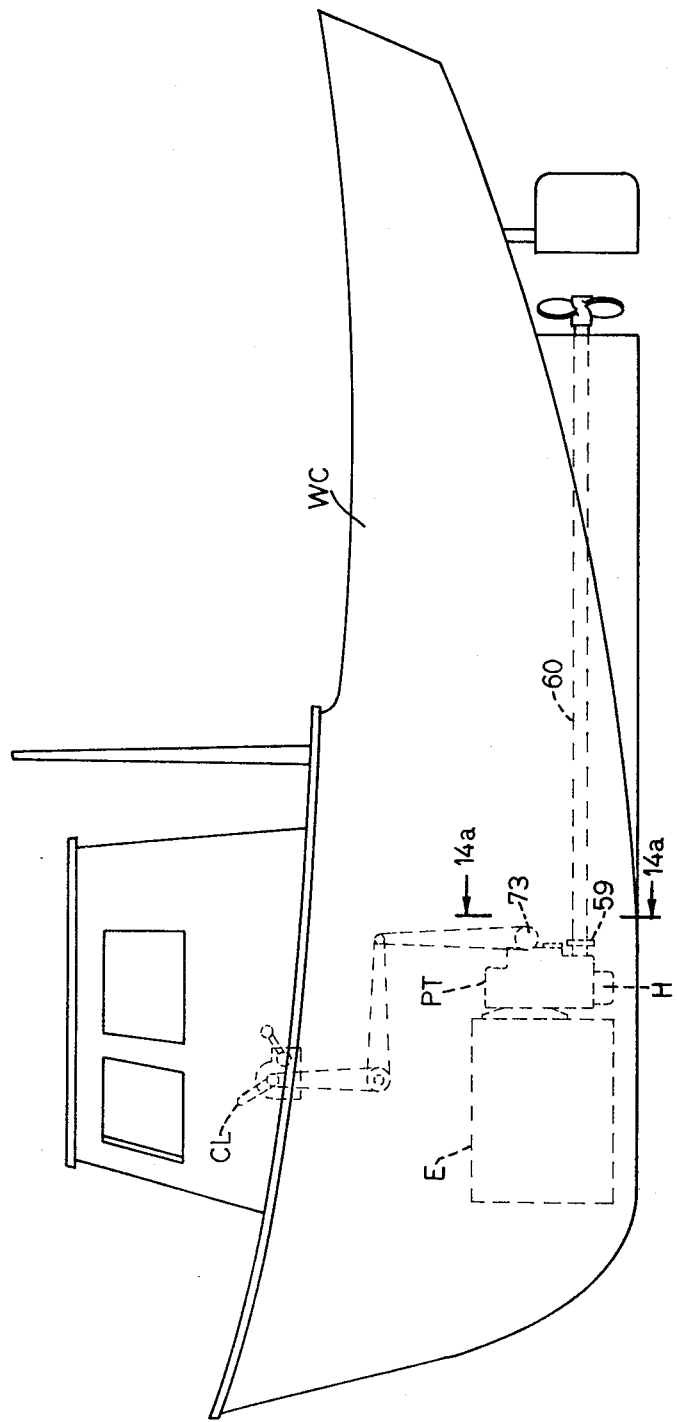

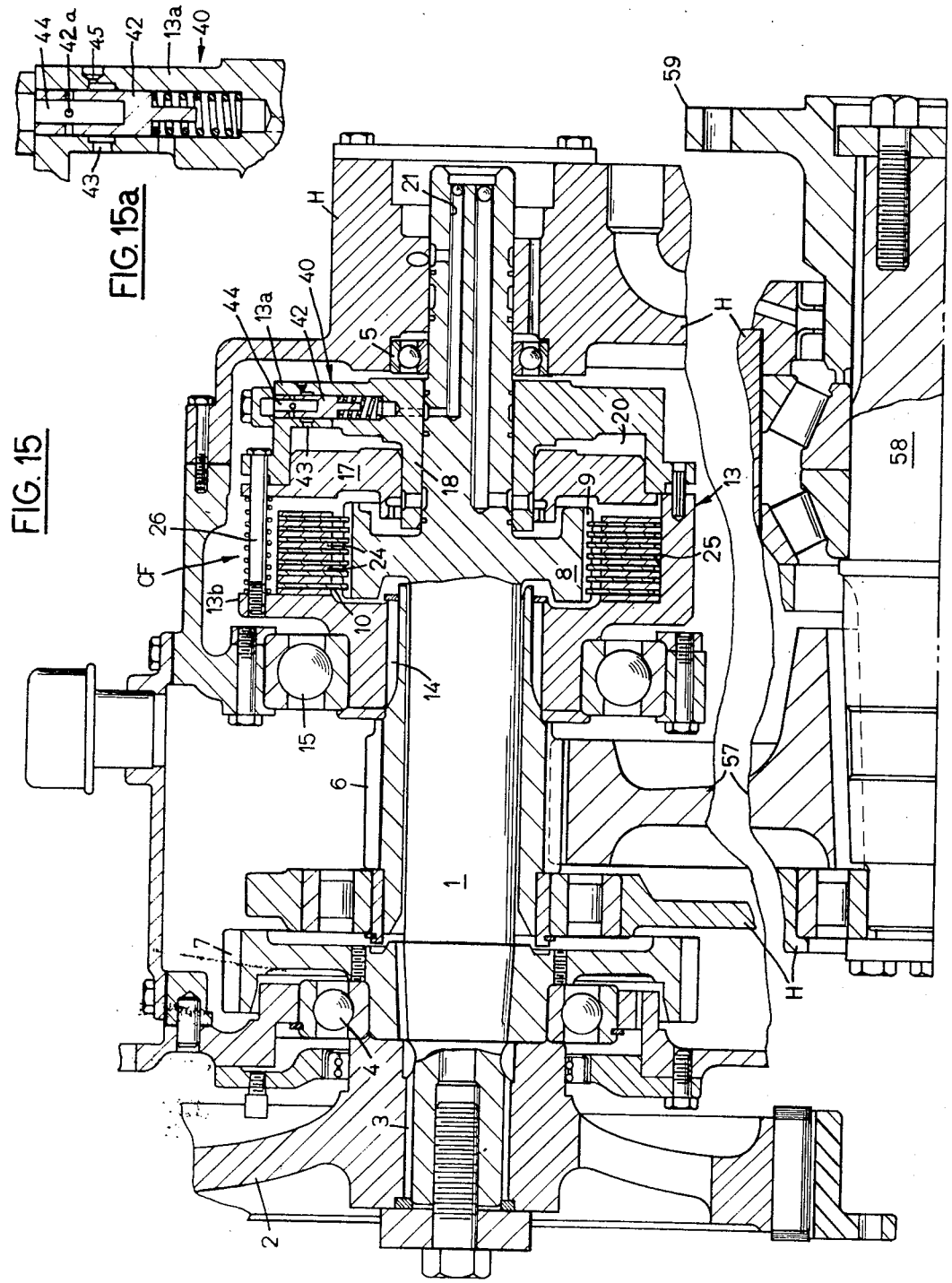

Patented Aug. 14, 1973

REVERSING CLUTCHES WITH SELECTOR AND PRESSURE MODULATING VALVE

BACKGROUND OF THE INVENTION

The present invention relates to power transmission and to control valve assemblies therefor and finds particular utility in driving a load where a centrifugal valve operated clutch is used and the power requirement is proportional to the cube of the speed, for example, as in a water craft having a propeller shaft that is to be driven in either rotational direction. While the invention finds particular utility when used with such water craft, other uses of the present invention are possible, such as for example with a torque converter, or other devices.

One example of a prior art transmission of the hydraulically actuated, friction clutch type, which clutches have centrifugal valves to regulate their output speed, is shown in the U.S. Pat. No. 3,613,469, issued Oct. 19, 1971 to McRoberts and Arnold, and which is entitled "Power Transmission of the Hydraulically Actuated, Friction Clutch Type." That patent utilized an electrical circuit including solenoids and switches in the controlling mechanism.

SUMMARY OF THE INVENTION

The present invention provides a power transmission including a pair of hydraulically actuated, friction plate type, modulating type clutches, one for effecting reverse direction and one for effecting forward direction of the vehicle or craft with which the invention is used, having an output shaft which is to be driven in either rotational direction, and a control valve assembly for selecting the desired clutch which is to be engaged and then causing the desired amount of fluid pressure to be available at the selected clutch so that the vehicle, craft, or other load is driven at a constant speed in the selected direction.

The invention is also directed to an improved control valve assembly for transmission of the above type wherein the assembly includes a rotatable selector spool which is under the influence of the operator and which, during its first or initial rotational movement acts to direct pressure fluid to either a forward or reverse, hydraulically actuated friction plate, modulating type clutch. After the desired clutch has been selected to thereby provide the proper direction of movement for the load, further rotational movement of the selector spool in the rotational direction selected, then acts to provide the desired amount of pressure fluid to the clutch so that the modulating clutch output speed remians constant. After the desired speed for the output of the clutch has been selected, the valve assembly stays to a balanced condition.

Another aspect of the invention relates to providing a power transmission and control valve assembly as above mentioned for use with a water craft having a propeller that is to be driven in either rotational direction.

These and other objects and advantages of the present invention will appear hereinafter as this disclosure progresses, reference being had to the accompanying drawings.

BRIEF DESCRIPTION OF THE DRAWINGS

FIG. 1 is generally a longitudinal, cross sectional view through the selector valve assembly made in accordance with the present invention, certain parts shown as being broken away or removed for clarity;

FIG. 2 is a view of the valve assembly shown in FIG. 1 and taken generally along the line 2—2 in FIG. 1, but with certain parts being shown as broken away, in section, or removed for the sake of clarity in the drawings;

FIG. 2a is an elevational view of the axially shiftable valve spool shown in FIG. 2;

FIG. 5 is a fragmentary, cross sectional view taken generally along the line 5—5 in FIG. 1;

FIG. 6 is a transverse cross sectional view taken along line 6—6 in FIG. 1;

FIG. 10 is a transverse, cross sectional view taken generally along the line 10—10 in either FIGS. 1 or 2;

FIG. 11 is a transverse, cross sectional view taken generally along the line 11—11 in FIG. 2;

FIG. 12 is a fragmentary, cross sectional view taken generally along the line 12—12 in FIG. 2;

FIG. 14 is a generally schematic, elevational view of a water craft embodying the present invention;

FIG. 15 is a longitudinal cross sectional view of the forward clutch and the power input shaft, the view being taken generally along the line 15—15 in FIG. 14a, but on an enlarged scale, certain parts being shown as further broken away for the sake of clarity;

FIG. 15a is an enlarged fragmentary view of the centrifugal valve shown in FIG. 15;

DESCRIPTION OF A PREFERRED EMBODIMENT

Figure 14A:
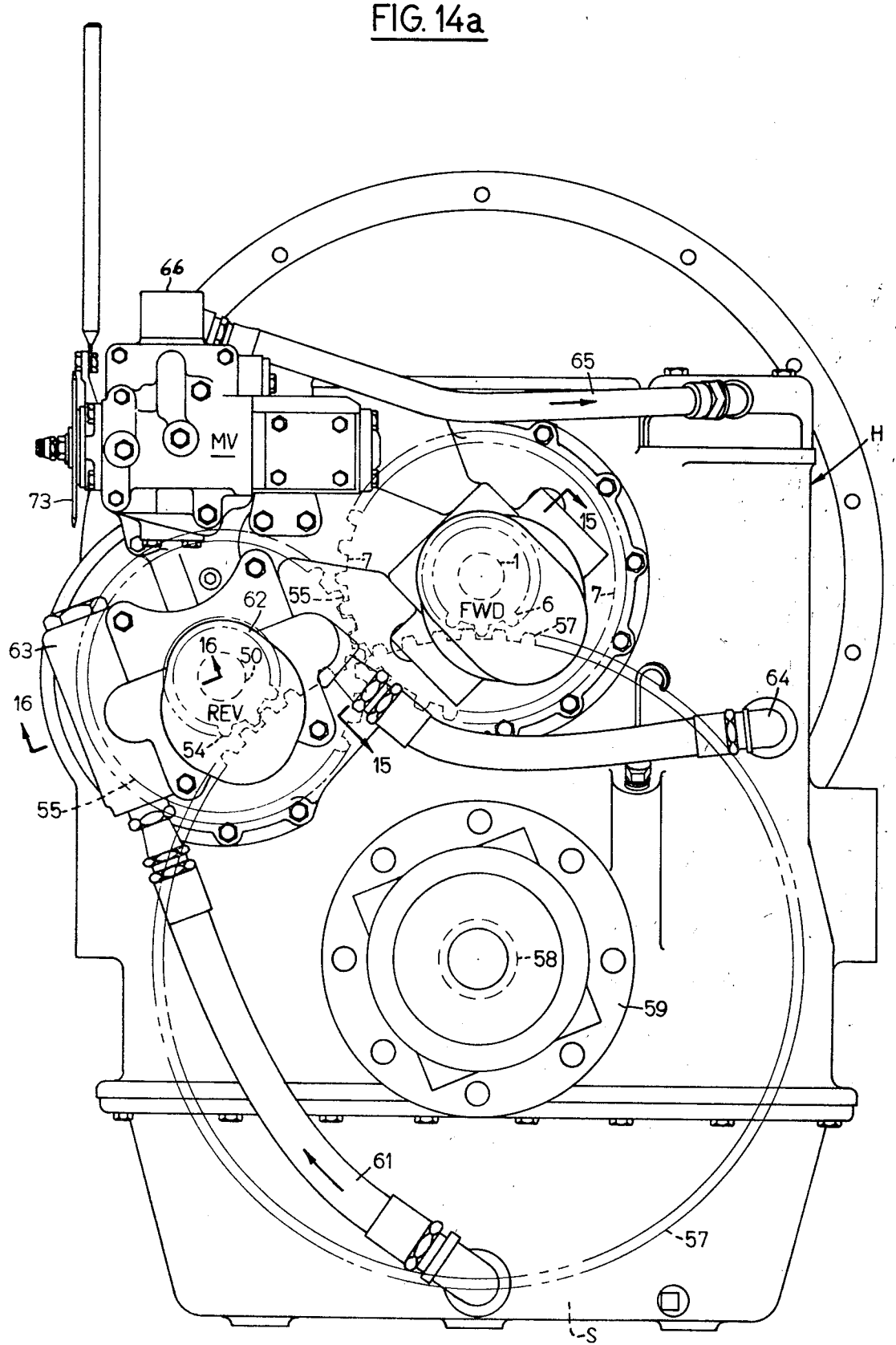
FIG. 14a is an end elevational view of a power transmission embodying the selector valve assembly shown in the other figures and the forward and reverse shafts and their gears, the view being taken generally along line 14a–14a in FIG. 14, but on an enlarged scale.

Referring generally to FIGS. 14 and 14a, the power transmission PT provided by the present invention is shown in a water craft WC where it finds particular utility and is driven from a power source such as an internal combustion engine E. The transmission includes a main housing H in which is rotatably mounted a power input shaft 1 which is driven from the engine, through the coupling 2 splined at 3 to the shaft 1.

Shaft 1 (FIG. 15) is suitably journalled by antifriction bearing assemblies 4 and 5 mounted in the housing and has a pinion 6 rotatably mounted thereon. A gear 7 is fixed on shaft 1 and the shaft 1 also has a diametrically enlarged annular portion 8 having external splines 9 on which are mounted the series of conventional friction plates 10 which rotate with the shaft 1. A clutch drum or friction plate carrier 13 has an end wall portion 13a rotatably journalled on shaft 1 and the carrier also includes an axially spaced end wall portion 13b that is splined at 14 to the hub of pinion 6. Portion 13b is rotatably journalled in the housing by the anti-friction bearing assembly 15. A clutch clamp-up piston 17 is slideably mounted on the axially extending hub 18 of carrier portion 13a, and this piston can shift axially, between clutch engaged and disengaged positions, due to fluid pressurization of an actuating chamber 20 formed between carrier portion 13a and the piston 17.

Pressure fluid is introduced to the expansible pressure chamber 20 via fluid passages 21 which is located in shaft 1 and through a centrifugal valve 40 (to be later described) in the portion 13a.

A series of friction plates 24 are mounted on the internal splines 25 formed in the carrier 13, and these plates 24 are interleaved with the shaft carried plates 10 and all of the plates are axially shfitable slightly so as to cause engagement and disengagement between the shaft 1 and gear 6 in the known manner. Bolt means 26 are located between end walls portions 13a and 13b and the piston 17 is slidingly and guidingly mounted on these circumferentially spaced bolt means. Furthermore, these interleaved plates can be made to slippingly engage one another to any degree, that is the clutch can be made to modulate to any degree so as to provide slipping engagement, thereby providing varying degrees of driving ability between the shaft 1 and gear 6.

The amount of clutch clamp up or engagement is provided by a centrifugally operated fluid valve 40, previously referred to, which is located in the carrier 13. Pressure fluid is fed to this valve 40 through the passage 21 in shaft 1 extending through the member 13 (FIG. 15) to the outer end of a radially shiftable spool 42 of the valve 40. A passage 42a in spool 42 and an alignable passage 43 in member 13 can place the valve chamber 44 in spool 42 in fluid communication with the clutch actuating chamber 20. An orifice 45 is provided for the valve to continually bleed fluid therefrom. A valve of this type is shown in the U.S. Pat., to Hilpert, No. 3,352,395, which issued Nov. 14, 1967 and entitled "Friction Clutch having Centrifugally Operated Valve Means," and if further details concerning the valve's construction and operation are deemed to be either necessary or desirable, reference may be had to that patent. Such a valve is also shown in the U.S. Pat. No. 3,613,469 which issued Oct. 19, 1971 and in which I am a co-inventor, and which, together with the said Hilpert Patent, have been assigned to an assignee common with the present application. It is believed to be sufficient to say, in connection with the valve 40, that as the carrier 13 rotates, centrifugal force acts to bias the spool 42 in a radial, outward direction, against the fluid pressure on the radial outer end of the valve which comes from passage 21. As rotational speed increases above a predetermined minimum, and spool 42 shifts radially outwardly to cause passage 43 to close and thereby cut off further flow to the clutch actuating chamber 20; this action causes the clutch plates to slip, thereby reducing output speed of the clutch. Conversely, when the rotational speed falls below a predetermined minimum, the spool 42 is shifted radially inwardly by the pressure, thereby exposing passage 43 to more fluid pressure, thus providing additional clamp-up force to the piston 17 and consequently to the clutch plates against which it bears, thereby increasing the clutch output speed. In this manner, the output speed of the friction plate clutch CF and the output shaft is held constant.

Figure 16:
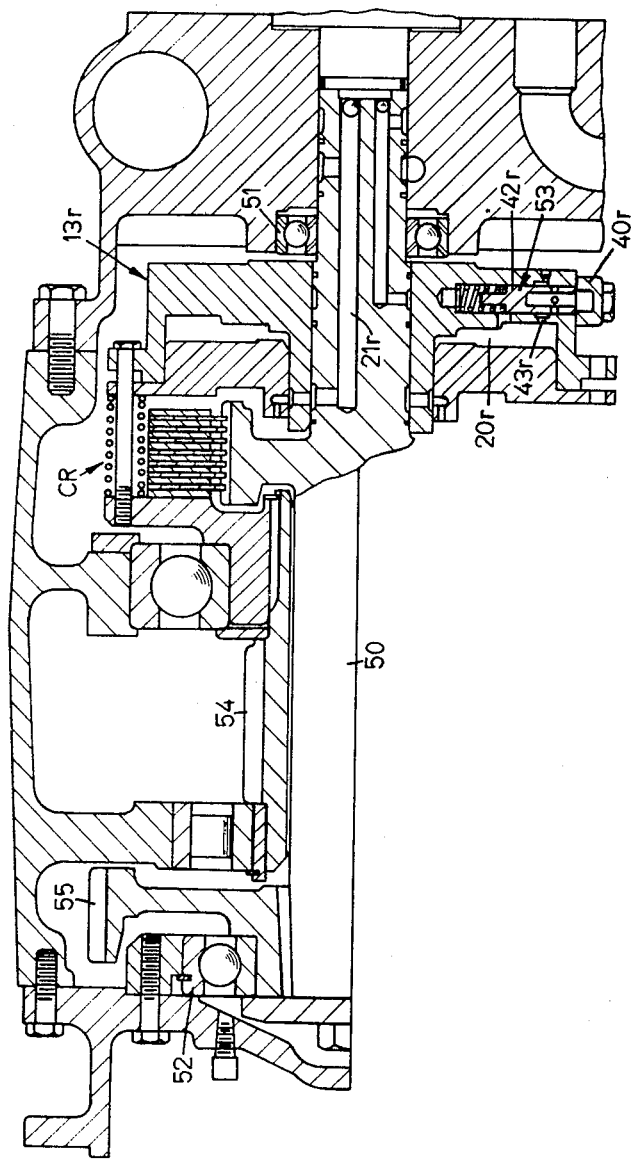
FIG. 16 is a fragmentary and longitudinal, cross sectional view of the reverse clutch and its shaft, the view being taken generally along the line 16—16 in FIG. 14a, but on an enlarged sclae.

Referring now to FIG. 16, a reverse shaft 50 is journalled for rotation by suitable anti-friction bearing assemblies 51 and 52 and the construction of the reverse clutch CR, and the centrifugal valve 53, is similar to that described in connection with FIG. 15, similar parts being correspondingly numbered with the addition of the suffix r. The shaft 50 also has a pinion 54 formed thereon. The shaft 50 has a gear 55 fixed thereon. Gear 7 of shaft 1 is in constant mesh with gear 55 of shaft 50.

The relationship between the forward clutch CF and the reverse clutch CR and their corresponding shafts and gears is as follows. A power output gear 57 is fixed to the power output shaft 58 (FIGS. 15 and 14a) rotatably journalled in the housing, and this gear 57 is in constant mesh with both pinion 6 on shaft 1 and pinion 54 of shaft 50, as indicated in FIG. 14a. An attaching flange 59 is fixed to the end of shaft 58 and a propeller shaft 60 (FIG. 14) is attached to this flange In this manner, either the forward clutch CF can be engaged, and clutch CR released, to provide forward direction to the vehicle or craft, or the reverse clutch CR is engaged and clutch CF is released to provide the reverse direction to the vehicle or craft, as follows.

When the clutch CF is engaged, the clutch CR is disengaged and power flows through shaft 1, carrier 13, pinion 6, and gear 57 to the output shaft 58 (FIG. 14a) of the transmission. When a reverse direction is desired, the clutch CF is released and clutch CR is engaged, thereby causing the power flow to be through shaft 1, gear 7 of shaft 1, gear 55 of shaft 50, through the clutch plate carrier 13r, pinion 54 and then through the meshing gear 57 to the output shaft 58.

Figure 17:
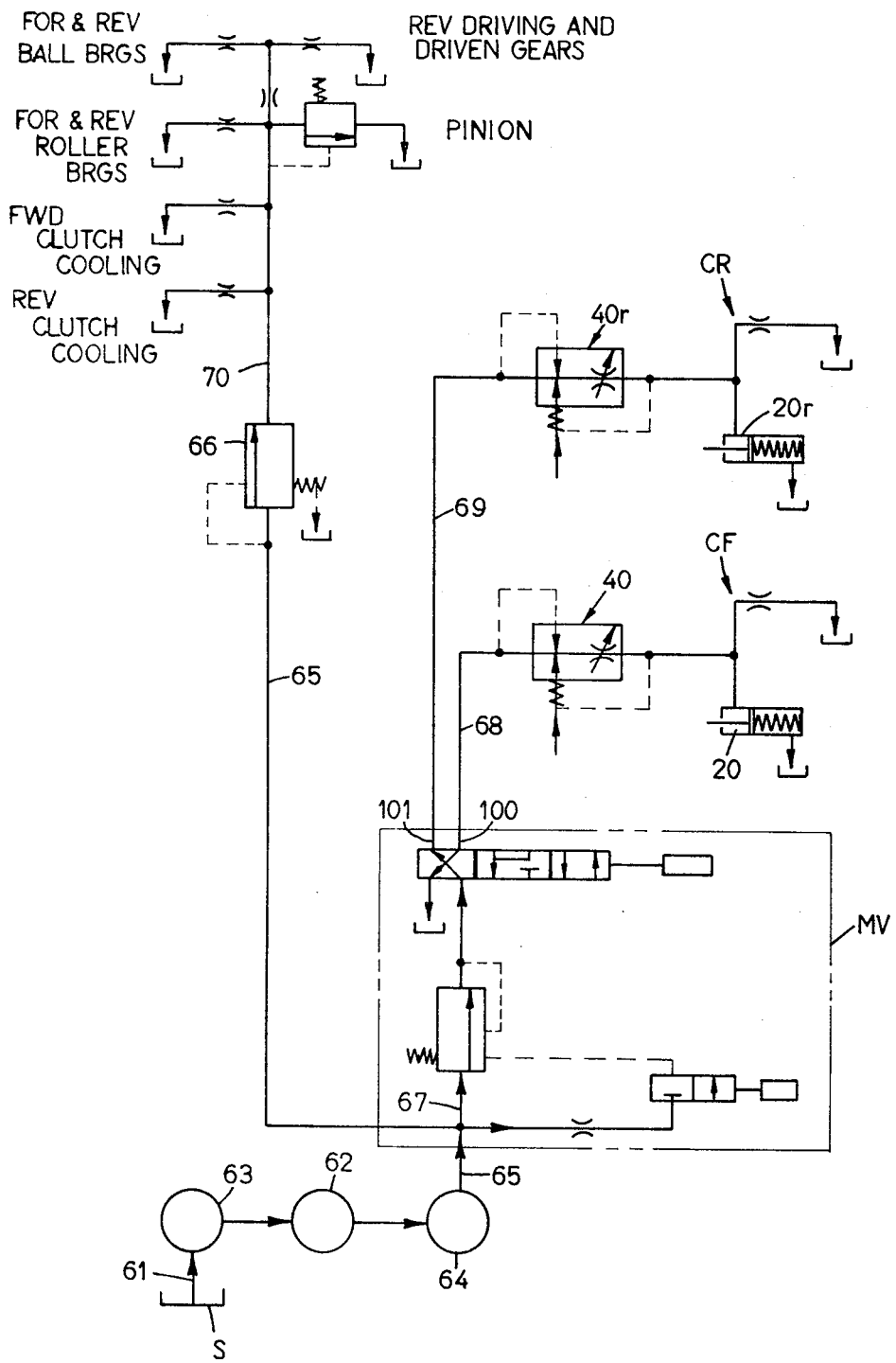
FIG. 17 is a generally schematic hydraulic circuit diagram of the circuit used with the present invention.

Referring to FIGS. 14a and 17, the general organization of the component parts will now be referred to. A sump S is located in the bottom of the transmission housing H and fluid is sucked therefrom via conduit 61 by the fluid pump 62 after first passing through a screen 63 of conventional character. The fluid then passes through a filter 64 through conduit 65 to a high pressure regulating valve 66. This valve 66 determines the amount of fluid pressure which will ultimately be directed via passage 67 (FIGS. 2, 10 and 17), through the modulating valve MV and the conduit 68 to the centrifugal valve 40r and consequently the actuating chamber of the reverse clutch CR or alternately via conduit 69 to the centrifugal valve 40 of the forward clutch CR.

Some fluid discharged from regulating valve 66 is also used to cool the forward and reverse clutches and also lubricate the various anti-friction bearings and gears and this fluid is conducted from the high pressure valve 66 via line 70 to the various said component parts, as indicated schematically in FIG. 17.

Reference has been made to the fact that a certain amount of high pressure fluid is directed to the modulating valve assembly MV and the description of this valve and its operation will now be described.

Figure 18:
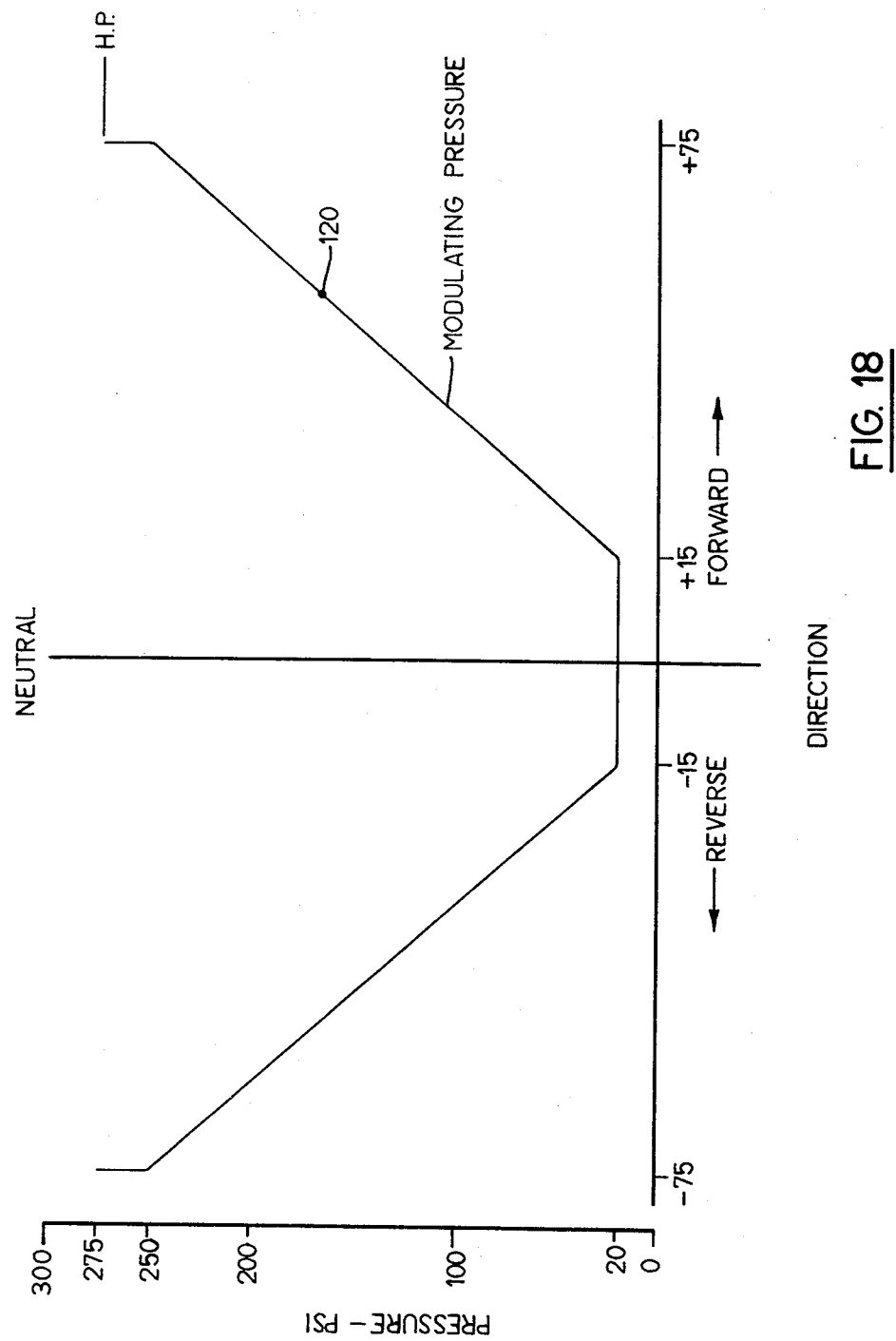
FIG. 18 is a graph showing the direction of movement of the vehicle or craft to be driven by the present invention as plotted against the pressure available to engage the clutches shown in FIGS. 15 and 16.

The general construction and arrangement of this valve MV is such that it has a rotatable selector spool 72 which is shown clearly in FIGS. 1, 2, 3, and 4, among others. The valve 40 also has an axially shiftable pressure control piston 77 and an axially shiftable, modulating valve spool 79, to be described. The valve MV is actuated by rotation of the spool 72 and this rotation is done manually and for example, can be accomplished by causing a sprocket 73, fixed on the outer end of the spool, to be rotated by the operator of the vehicle or craft. Initial rotation of the spool 72 from a neutral position, which neutral position is shown in FIGS. 1, 2, 3, 4, 5 and 6, causes selection of the direction of vehicle movement, depending on which direction of rotation of the valve. This initial movement is, for example, in the amount of approximately 15 degrees in either reverse or forward directions, and this valve movement is further indicatd in the graph of FIG. 18. After this initial rotational movement of the valve spool in either direction, continued rotation in the selected direction causes a rise or increasing modulation of the fluid pressure which is delivered to the selected clutch CR or CR. This modulating pressure rise is shown in FIG. 18 as the inclined line in either direction. Then, when a predetermined pressure has been reached, say for example as at point 120, the clutch output speed will remain constant.

The more specific operation of the modulating valve and its orifice balancing feature will now be referred to.

The valve MV includes a valve housing or body 75 having an axial bore 71 in which the selector spool 72 is rotatable. The axially shiftable piston 77 is mounted within bore 78 of the body 75 and an axially shiftable spool 79 mounted in bore 76 having an enlarged end 79a is also mounted in the body.

The spool 79 (FIG. 2a) includes land portions 79c, and 79d and an intermediate, diametrically reduced portion 79e. The valve body 75 also includes a high pressure chamber 80, a modulating pressure chamber 81 and a sump pressure chamber 82, all of which are communicable with the valve spool 79. A light spring 83 is located in the end portion 84 of the bore 76 and tends to urge the spool 79 to the left, as viewed in FIG. 1. When the valve spool 79 is shifted to the left (FIG. 1), the sump chamber 82 acts to vent the modulating pressure when that pressure becomes excessive.

High pressure fluid is introduced into the valve housing through passage 67 (FIGS. 2 and 10) and then through an axial passage 67a to the high pressure chamber 80. Thus, high pressure is always available in chamber 80. High pressure fluid which is thus introduced into chamber 80 is throttled at the small annular groove 90 formed at the juncture of the land 79c of the valve spool and the bore 76. This high pressure is thereby reduced into modulating pressure in chamber 81.

Referring to FIGS. 2 and 12, a certain amount of high pressure fluid is also directed from the axial passage 67a through a cored passage 69 which in turn communicates with another axially extending passage 67b (FIGS. 2, 11 and 12). The passage 67b then communicates with a transverse passage 67c (FIG. 11) containing an orifice 67d through which the fluid pressure is throttled, causing a pressure drop. The pressure fluid then passes through a transverse hole 72c in the spool stem 72a.

As shown in FIG. 2, a fluid passage 85 connects the modulating pressure chamber 81 with the end portion bore 84 at the end of the spool, and consequently, modulating pressure is thus directed to the end of the spool for urging it to the left. A pair of springs 87 and 88 (FIG. 1) of different strengths, act between the piston 77 and the enlarged end 79a of the spool 79 and urge the spool 79 to the right hand position (as viewed in FIG. 1), and against the action of the modulating pressure and the spring 83 at the opposite end of the spool 79.

Modulating pressure is also conducted from chamber 81 through the right angle passage 92 (FIG. 1) through a cross port 91 in stem 72a and then through the central and axially extending passage 93 to the radial passage 94 (FIGS. 1 and 6) in the diametrically enlarged portion 72b of the selector spool 72, which enlarged portion 72b is rotatable in the large bore 96 formed in the housing 75. Also formed in the housing, as shown clearly in FIG. 6, is a passage 100 that conducts the modulating pressure as will appear, to and from the forward clutch CF. Another passage 101 which, depending on the rotational position of the selector spool 72, conducts the modulating pressure to and from the reverse clutch CR.

Low or sump pressure is also conducted to each axial side of the enlarged portion 72b of the selector spool so as to hydraulically balance the selector spool, thus faciliating its easy rotation. This sump pressure is located in an annular space 102 at the right side (FIG. 1) of the enlarged portion 72b, and sump pressure is conducted to the space 103 on the left side of the enlarged portion 72b via the axial ports 104a and 104b (FIGS. 1, 5 and 6) which extend through the enlarged portion 72b.

The passage 104a or 104b also serve to dump or exhaust that particular clutch which is not being engaged. For example, in the position shown in FIG. 6, both clutches are being vented to sump because the transmission is in neutral. When the spool 72 is rotated (as indicated by the curvilinear arrow) to permit modulating pressure to flow to the forward clutch passage 100, then port 104a acts to vent the reverse clutch passage 101 to the sump via spaces 102 and 103 (FIG. 1), and passages 105, 106 (FIG. 10).

As shown in FIG. 5, a spring loaded plunger 112 selectively engages either the neutral detent 108, the forward detent 111, or the reverse detent 110.

With the above construction, initial rotation of the selector spool 72 causes modulating fluid pressure to be selectively directed to either of the clutches CF or CR.

The pressure control piston 77 (FIGS. 1, 2, 3 and 4) previously referred to has an elongated and diametrically smaller sleeve 77b which is cut away, as clearly indicated in FIGS. 3, 4, 4a and 4b, to form an inclined or tapered surface 77c which defines a V-shaped opening 77d. This V-shaped opening is symmetrical about a longitudinal centerline when viewed in FIG. 4 and increases in depth from right to left when viewed in FIG. 3.

The transverse hole 72c of the spool stem 72a communicates with the central axial passage 72d of the spool 72. Passage 72d is defined at either end by the sealing balls 74 and 74a. Furthermore, the spool 72 has a radial port 72e. High pressure fluid is thus conducted through passage 67a, 67b, 67c, orifice 67d, chamber 107, passage 72c, radial port 72e and when port 72e is open, to the sump pressure area at the right side of piston 77. This hole or port 72e acts as an orifice, as will appear, and can be either open, fully closed, or partially closed depending both on the rotational position of the selector spool 72 as well as the axial position of the piston 77.

The annular chamber 107 which is formed in the housing 75 adjacent the piston 77 permits high pressure fluid to act against the left side (FIG. 1) of the piston 77, thereby urging the latter to the right and against the bias of the springs 87 and 88, and also against the action of the valve spool 79.

The operation of the above control valve assembly and transmission is as follows.

High pressure fluid is always available at the high pressure chamber 80 and when the valve is in the equilibrium position shown in FIGS. 1, 2, 3 and 4, this high pressure fluid is throttled through the groove 90 (FIG. 1) and into the modulating pressure chamber 81. At the same time, high pressure fluid flows through the cored passage 69 (FIGS. 2 and 4b), and into passage 67b, 67c, through orifice 67d and as the fluid passes through the orifice 67d its pressure drops. Pressure fluid is thus available in the chamber 107 to act on the end of the control piston 77. However, as long as the orificing hole 72e in the selector spool stem is open, this pressure simply flows through orifice 72e to the sump area, and consequently the control piston 77 does not shift to the right.

Referring again to the modulating pressure which is then in chamber 81, this pressure is then conducted in an axial direction through the passage 92 and then radially into the center axial passage 93 of the selector spool where it then is delivered to the radial passage 94 (FIG. 6). If the selector spool is in the neutral position shown, no action occurs. However, if the selector spool is initially rotated in either direction, the modulating pressure, designated MP in FIG. 6 is available to either the passage 100, which is in communication with the forward clutch CF or alternatively, to the passage 101 which is in communication with the reverse clutch CR. Thus, initial rotation of the selector spool actually selects the direction of rotation of the output of the transmission.

Figure 4:
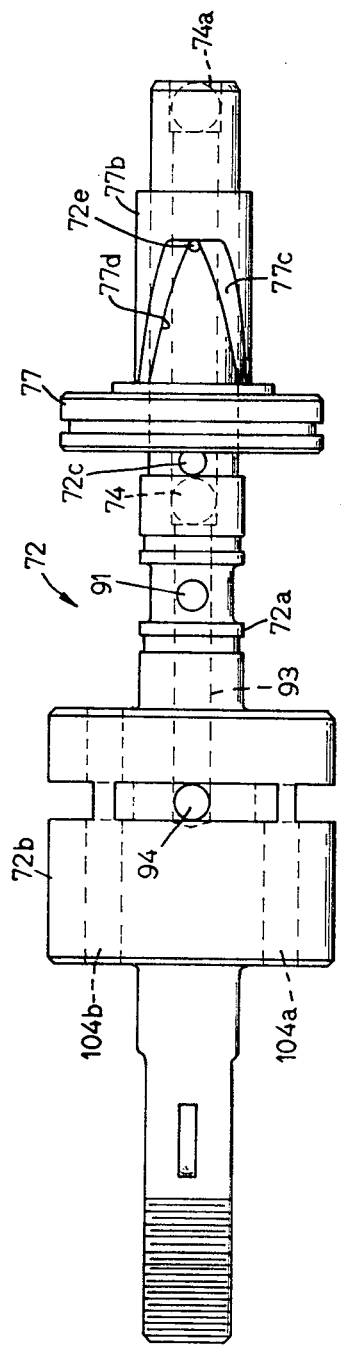
FIG. 4 is another view of the selector spool, as shown in FIG. 2.
Figure 3:
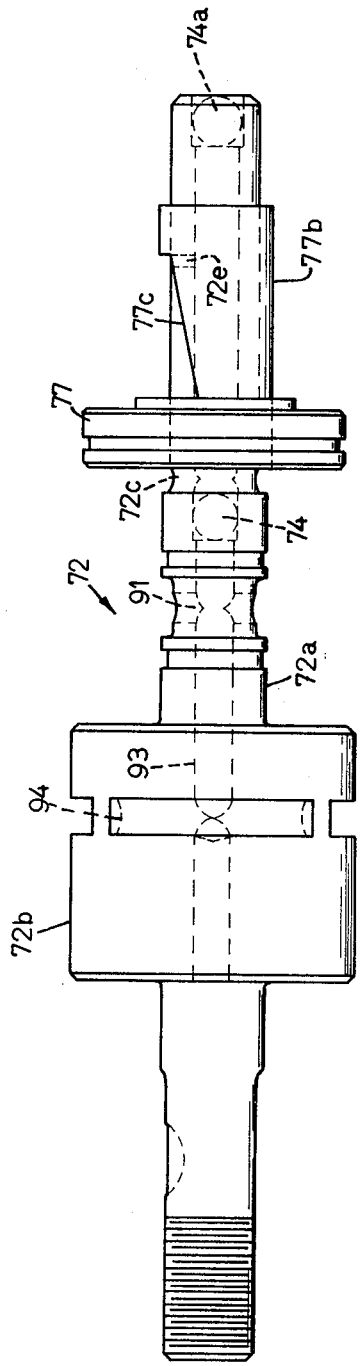
FIG. 3 is an elevational view of the selector spool as shown in FIG. 1.
Figure 4A:
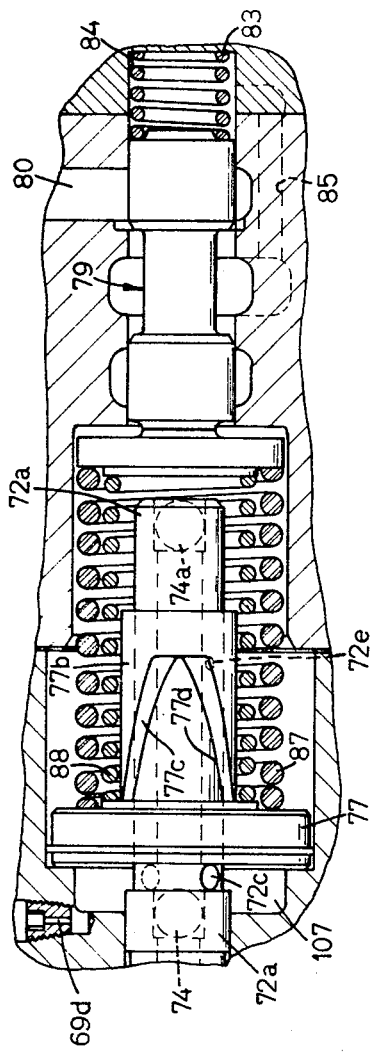
FIG. 4a is a view of a portion of the selector spool shown in FIG. 4 but showing the selector spool when rotated to a different position so as to block its orificing hole.
Figure 4B:
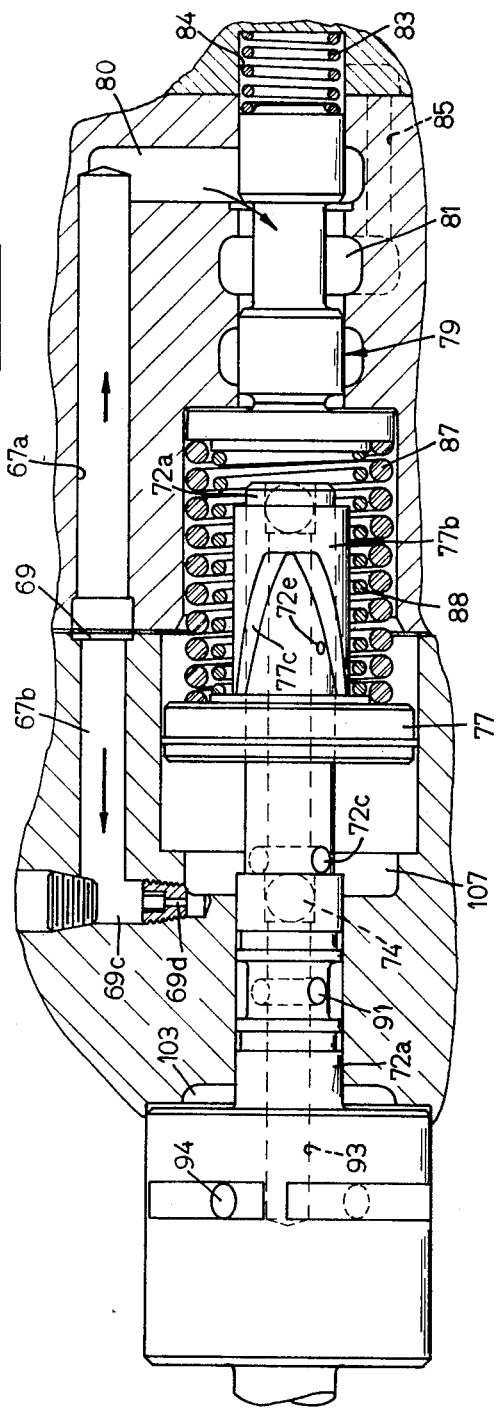
FIG. 4b is a view similar to FIG. 4a, but showing the control piston when it has shifted so as to shift the valve spool and also again uncover the orificing hole to create a balanced condition.
Figure 7:
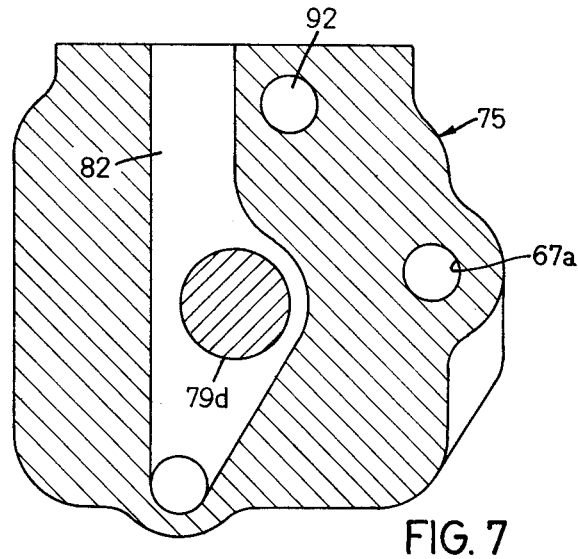
FIG. 7 is a transverse, cross sectional view through the sump pressure chamber and taken along 7—7 in FIG. 1.
Figure 8:
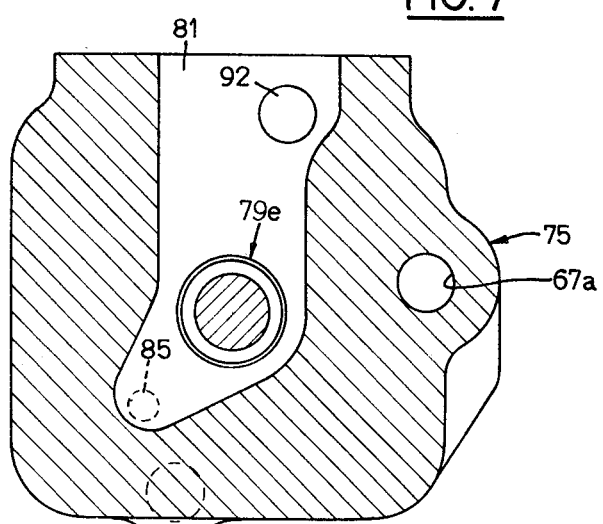
FIG. 8 is a transverse, cross sectional view through the modulating pressure chamber and taken along line 8—8 in FIG. 1.
Figure 9:
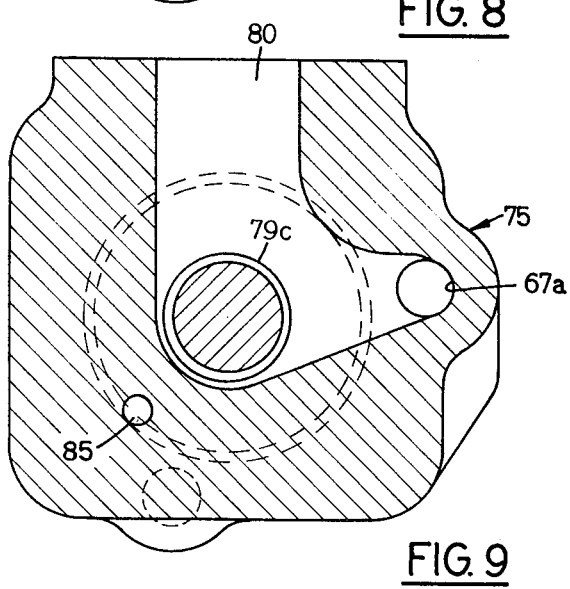
FIG. 9 is a transverse, cross sectional view through the high pressure supply chamber and taken along line 9—9 in FIG. 1.
Figure 13:
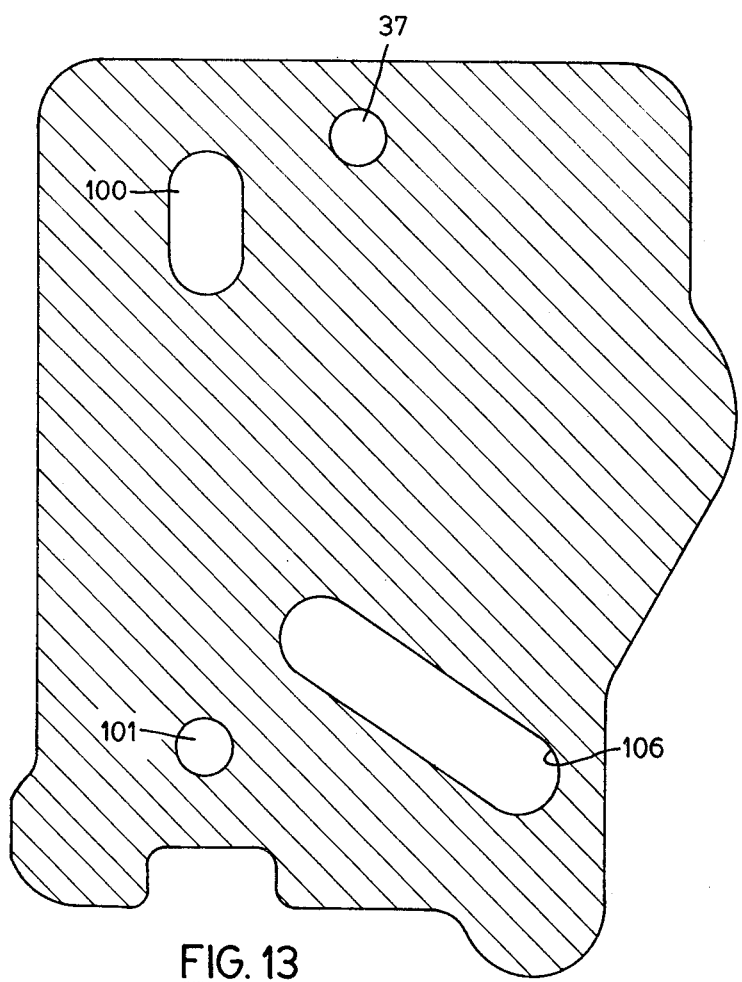
FIG. 13 is a longitudinal, cross sectional view taken along line 13—13 of FIG. 1.

Reference will now be made to the action of the selector spool in directing a certain amount of modulating pressure to the selected clutch. Referring also to FIGS. 3, 4, 4a and 4b, FIG. 4 shows the position of the selector spool in the neutral position and FIG. 4a shows the selector spool stem when it has been rotated as above described, which has moved the orificing hole 72e to a position where it is blocked or covered by the sleeve 77b of the piston. This blocking of the orificing hole 72e causes a build up of pressure in the chamber 107 behind the piston 77, thereby urging the piston 77 to the right as shown in FIG. 4b. When the piston has moved axially sufficiently as shown in FIG. 4b, the hole 72e is again uncovered. In moving to the right, the piston through the action of the springs 87 and 88 causes the valve spool 79 to shift to the right (FIG. 4b) against the modulating pressure in chamber 84 and also against the action of the spring 83 in the chamber 84. This shifting of the spool 79 causes a greater opening between the high pressure chamber 80 and the modulating pressure chamber 81, thus causing more pressure fluid to flow into the modulating chamber as indicated by the arrow in FIG. 4b. This increased pressure then of course is directed to the selected clutch via the passages 92, 93, 94 and either 100 or 101.

For example, referring to FIG. 18, assume the position to which the selector spool has been rotated as shown in FIGS. 4a and 4b, is such that an amount of modulating pressure is provided to the clutch as represented by the point 120 on the chart, and also assuming that the forward clutch CF has been selected. The pressure represented at point 120 on the chart in FIG. 18 represents one output speed of the clutch, that is to say it represents the pressure that is imposed on the radially outer end of the control valve 40 of the particular clutch selected. It will be seen that any degree of modulating pressure can be selected for either the clutch, that is to say, any constant output speed of the clutch may be selected by the selector spool rotational movement.

Thus, the control piston 77 moves axially to follow up to a point where the hole 72e is again exposed, and this amount of follow-up movement is dependent on how much rotational movement was imparted to the selector spool.

The piston will hold its selected axial position, as determined by the amount of rotation of the selector spool, whenever the pressure drop across the orifice 67d is equal to the pressure drop through hole 72e.

The springs 87 and 88 act together to prvide a reference force, that is, a force that represents the amount of working pressure desired. This spring force is balanced by the modulating pressure acting on the end of the piston 77. Thus, the amount of rotation of the selector spool 72 determines the amount of modulating pressure admitted to the clutch and conseuqently determines the output speed of the transmission.

I claim:

1. A power transmission comprising, a hydraulically actuated forward clutch of the modulatable friction plate type, a hydraulically actuated reverse clutch of the modulatable friction plate type, and a hydraulic valve assembly for controlling the selection of engagement of either of said clutches and also for controlling the modulation of the selected clutch, said valve assembly comprising; a valve body and a rotatable selector spool in said body and having passage means for directing fluid pressure selectively to either of said clutches when said selector spool is initially rotated in a corresponding direction from a neutral position, said selector spool having a fluid orificing hole, a fluid control piston axially shiftable on said selector spool and having a generally V-shaped opening in its periphery which is registerable with said orificing hole, spring means for biasing said piston toward one axial position, a hydraulic valve spool axially shiftable in said body and biased by said spring means away from said piston, a high pressure fluid passage means and also modulating pressure fluid passage means in said body both communicable with said hydraulic valve spool, whereby high pressure is throttled into said modulating pressure fluid passage means, said modulating pressure fluid passage means also being in communication with the end of said valve spool which is remote from said spring means to thereby urge said valve spool against said spring means and towards said piston to additionally bias the latter, said modulating pressure fluid passage means also in communication with said selector spool passage means, said hydraulically actuated clutches having conduit means communicating with said passage means in said selector spool, whereby modulating pressure is delivered selectively to said clutches, said high pressure fluid passage means also communicating with the side of said piston remote from said spring means to thereby bias said piston towards said valve spool to thereby also bias the latter through said spring means to a position which permits an increase of pressure fluid from said high pressure fluid passage means to said modulating pressure fluid passage means, the cooperative arrangement between said generally V-shaped opening on said piston and said hole in the said selector spool is such that when said selector spool is rotated in either direction from neutral, said hole is blocked, and said piston is then shifted axially by pressure fluid on said piston side to uncover said hole and modulating pressure fluid is directed to said engaged clutch at a pressure dependent on the amount of rotation of said selector spool, thereby to cause clutch engagement.

2. The transmission set forth in claim 1 further characterized in that said selector spool includes a central stem with an axial passage therein and said orificing hole is located in said stem and in fluid communication with said axial passage, and further characterized in that said control piston includes a sleeve in which said generally V-shaped opening is located.

3. A power transmission comprising a power input shaft, a power output shaft, intermeshing gear means between said shafts, a hydraulically actuated forward clutch of the modulatable friction plate type and a hydraulically actuated reverse clutch of the modulatable friction plate type connectable with said gear means, and a hydraulic valve assembly for controlling the selection of engagement of either of said clutches and also for controlling the modulation of the selected clutch, said valve assembly comprising: a valve body and a rotatable selector spool in said body and having passage means for directing fluid pressure selectively to either of said clutches when said selector spool is initially rotated in a corresponding direction from a neutral position, said selector spool having a central stem with an axial passage therein and a hole in said stem and in communication with said axial passage, a fluid control piston axially shiftable on said selector spool and having a sleeve defining a generally V-shaped opening in its periphery which is registerable with the hole in said selector spool stem, spring means for biasing said piston toward one axial position, a hydraulic valve spool axially shiftable in said body and biased by said spring means away from said piston, a high pressure fluid passage means and modulating pressure fluid passage means in said body and communicable with said hydraulic valve spool, whereby high pressure is throttled as modulating pressure into said modulating pressure fluid passage means, said modulating pressure fluid passage means also being in communication with the end of said valve spool which is remote from said spring means to thereby urge said valve spool which is remote from said spring means to thereby urge said valve spool against said spring means and towards said piston to additionally bias the latter, said modulating pressure fluid passage means also in communication with said selector spool passage means, said hydraulically actuated clutches having conduit means communicating with said passage means in said selector spool, whereby modulating pressure is delivered selectively to said clutches, said high pressure fluid passage means also communicating with the side of said piston remote from said spring means to thereby bias said piston and its said spring means to a position which permits an increase of pressure fluid from said high pressure fluid passage means to said modulating pressure fluid passage means, the arrangement between said generally V-shaped opening on said piston sleeve and said hole in the said selector spool stem is such that when said selector spool is rotated in either direction from neutral, said hole is blocked until said piston is shifted axially to uncover said hole and modulating pressure fluid is directed to said engaged clutch in an amount dependent on the amount of rotation of said selector spool to cause clutch engagement and consequent rotation of said output shaft in either direction of rotation and at a predetermined constant speed.

4. A fluid pressure control valve assembly comprising: a valve body and a rotatable selector spool in said body and having passage means for directing fluid pressure selectively to either of two loads when said selector spool is initially rotated from a neutral position, said selector spool having a fluid orificing hole, a fluid control piston axially shiftable on said selector spool and having a generally V-shaped opening in its periphery which is registerable with said orificing hole, spring means for biasing said piston toward one axial position, a hydraulic valve spool axially shiftable in said body and biased by said spring means away from said piston, a high pressure fluid passage means and modulating pressure fluid passage means in said body and communicable with said hydraulic valve spool, whereby high pressure is throttled into said modulating pressure fluid passage means, said modulating pressure fluid passage means also being in communication with the end of said valve spool which is remote from said spring means to thereby urge said valve spool against said spring means and towards said piston to additionally bias the latter, said modulating pressure fluid passage means also in communication with said selector spool passage means, said passage means in said selector spool being communicable with said loads for conducting modulating pressure selectively to said loads, said high pressure fluid passage means also communicating with the side of said piston remote from said spring means to thereby bias said piston towards said valve spool to thereby bias the latter through said spring means to a position which permits an increase of pressure fluid from said high pressure fluid passage means to said modulating pressure fluid passage means, the arrangement between said generally V-shaped opening on said piston and said hole in the said spool in such that when said selector spool is rotated in either direction from neutral, said hole is blocked until said piston is shifted axially to uncover said hole and modulating pressure fluid can be directed to said loads in an amount dependent on the amount of rotation of said selector spool.

5. A control valve assembly comprising; a valve body and a rotatable selector spool in said body and having passage means for directing fluid pressure selectively to either of two loads when said selector spool is initially rotated in a corresponding direction from a neutral position, said selector spool also having a hole in its periphery, a fluid control piston member axially shiftable on said selector spool and having a generally V-shaped opening in its periphery which is registerable with the hole in said selector spool, means for biasing said piston member toward one axial position, a hydraulic valve spool axially shiftable in said body and biased by said piston member biasing means away from said piston member, a high pressure fluid passage means and modulating pressure fluid passage means in said body and communicable with said hydraulic valve spool and with each other via said valve spool, said modulating pressure fluid passage means also being in communication with the end of said valve spool which is remote from said spring means to thereby urge said valve spool against said piston member biasing means and towards said piston means to additionally bias the latter, said modulating pressure fluid passage means also in communication with said selector spool passage means, said high pressure fluid passage means also communicating with the side of said piston means remote from said piston member biasing means to thereby bias said piston means towards said valve spool to thereby bias the latter through said piston member biasing means to a position which permits an increase of pressure fluid from said high pressure passage means to said modulating pressure passage means, the arrangement between said generally V-shaped opening on said piston means and said hole in said selector spool is such that when said sleector spool is rotated in either direction from neutral, said hole is blocked until said piston means is shifted axially to uncover said hole and modulating pressure fluid can be directed to a selected load via said rotatable spool passage means in an amount dependent on the amount of rotation of said selector spool.

6. A control valve assembly for controlling the selection and amount of modulation and a pair of hydraulically actuated, modulatable friction plate clutches, said assembly comprising: a valve body and a rotatable selector spool in said body and having passage means for directing fluid pressure selectively to either of said clutches when said selector spool is initially rotated in a corresponding direction from a neutral position, said selector spool having a central stem with an axial passage therein and a hole in said stem and in communication wtih said axial passage, a fluid control piston axially shiftable on said selector spool and having a sleeve defining a generally V-shaped opening in its periphery which is registerable with the hole in said selector spool stem, spring means for biasing said piston toward one axial position, a hydraulic valve spool axially shiftable in said body and biased by said spring means away from said piston, a high pressure fluid passage means and modulating pressure fluid passage means in said body and communicable with said hydraulic valve spool, whereby high pressure is throttled as modulating pressure into said modulating pressure fluid passage means, said modulating pressure fluid passage means also being in communication with the end of said valve spool which is remote from said spring means to thereby urge said valve spool against said spring means and towards said piston to additionally bias the latter, said modulating pressure fluid passage means also in communication with said selector spool passage means, said passage means in said selector spool being communicable with said clutches, whereby modulating pressure can be delivered selectively to said clutches, said high pressure fluid passage means also communicating with the side of said piston remote from said spring means to thereby bias said piston and its sleeve towards said valve spool to thereby bias the latter through said spring means to a position which permits an increase of pressure fluid from said high pressure fluid passage means to said modulating pressure fluid passage means, the arrangement between said generally V-shaped opening on said piston sleeve and said hole in the said spool stem is such that when said selector spool is rotated in either direction from neutral, said hole is blocked until said piston is shifted axially to uncover said hole and modulating pressure fluid can be directed to said engaged clutch in an amount dependent on the amount of rotation of said selector spool.

7. In combination with a water craft having an engine, a power transmission driven by said engine and including a hydraulically actuated forward clutch of the modulatable friction plate type and a hydraulically actuated reverse clutch of the modulatable friction plate type, and a propeller shaft driven in either rotational direction by said transmission, and a hydraulic valve assembly for controlling the selection of engagement of either of said clutches and also for controlling the modulation of the selected clutch, said valve assembly comprising:

a valve body and a rotatable selector spool in said body and having passage means for directing fluid pressure selectively to either of said clutches when said selector spool is initially rotated in a corresponding direction from a neutral position, said selector spool having a fluid orificing hole, a fluid control piston axially shiftable on said selector spool and having a generally V-shaped opening in its periphery which is registerable with said orificing hole, spring means for biasing said piston toward one axial position, a hydraulic valve spool axially shiftable in said body and biased by said spring means away from said piston, a high pressure fluid passage means and modulating pressure fluid passage means in said body and communicable with said hydraulic valve spool, whereby high pressure is throttled into said modulating pressure fluid passage means, said modulating pressure fluid passage means also being in communication with the end of said valve spool which is remote from said spring means to thereby urge said valve spool against said spring means and towards said piston to additionally bias the latter, said modulating pressure fluid passage means also in communication with said selector spool passage means, said hydraulically actuated clutches having conduit means communicating with said passage means in said selector spool, whereby modulating pressure is delivered selectively to said clutches, said high pressure fluid passage means also communicating with the side of said piston remote from said spring means to thereby bias said piston towards said valve spool to thereby bias the latter through said spring means to a position which permits an increase of pressure fluid from said high pressure fluid passage means to said modulating pressure fluid pasage means, the arrangement between said generally V-shaped opening on said control piston and said hole in the said selector spool is such that when said selector spool is rotated in either direction from neutral, said hole is blocked until piston is shifted axially to uncover said hole and modulating pressure fluid is directed to said engaged clutch in an amount dependent on the amount of said rotation of said selector spool to cause clutch engagement and consequent rotation of said propeller shaft.

8. The combination set forth in claim 7 further characterized in that said selector spool includes a central stem with an axial passage therein and said orificing hole is located in said stem and in fluid communication with said axial passage, and further characterized in that said control piston includes a sleeve in which said generally V-shaped opening is located.

* * * * *